(12) United States Patent
Agon

(10) Patent No.: US 11,536,823 B2
(45) Date of Patent: Dec. 27, 2022

(54) SENSOR CIRCUIT USING ORTHOGONAL PHASE CODING

(71) Applicant: Apple Inc., Cupertino, CA (US)

(72) Inventor: Zohar Agon, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 375 days.

(21) Appl. No.: 16/717,854

(22) Filed: Dec. 17, 2019

(65) Prior Publication Data

US 2021/0181327 A1    Jun. 17, 2021

(51) Int. Cl.
| | |
|---|---|
| *G01S 13/32* | (2006.01) |
| *G01S 13/34* | (2006.01) |
| *G01S 13/28* | (2006.01) |
| *G01S 7/00* | (2006.01) |
| *G01S 7/288* | (2006.01) |
| *G01S 7/35* | (2006.01) |

(52) U.S. Cl.
CPC ............ *G01S 13/325* (2013.01); *G01S 7/006* (2013.01); *G01S 7/288* (2013.01); *G01S 7/354* (2013.01); *G01S 13/288* (2013.01); *G01S 13/343* (2013.01); *G01S 7/2883* (2021.05)

(58) Field of Classification Search
None
See application file for complete search history.

(56) References Cited

U.S. PATENT DOCUMENTS

| | | |
|---|---|---|
| 9,715,609 B1 * | 7/2017 | Fink .......................... H01Q 3/40 |
| 10,082,562 B1 | 9/2018 | Abari et al. |
| 2018/0156907 A1 | 6/2018 | Cegla et al. |
| 2019/0219683 A1 | 7/2019 | Fang |
| 2020/0011983 A1 * | 1/2020 | Kageme ................ G01S 13/325 |
| 2021/0063555 A1 * | 3/2021 | Ertem .................... G01S 13/003 |

* cited by examiner

*Primary Examiner* — Whitney Moore
(74) *Attorney, Agent, or Firm* — Kowert, Hood, Munyon, Rankin & Goetzel, P.C.; Dean M. Munyon

(57) ABSTRACT

A transceiver circuit included in a computer system may include multiple antennas, a transmitter circuit and a receiver circuit. The transmitter circuit may store an identifier number and generate multiple numbers using the stored identifier number. The transmitter circuit may also generate a transmit signal that include multiple pulses, where a. given pulse may include multiple chirps encoded with the multiple numbers. The receiver circuit may receive a reflected version of the transmit signal and generate an output signal using the reflected version of the transmit signal.

15 Claims, 12 Drawing Sheets

SENSOR CIRCUIT USING ORTHOGONAL PHASE CODING

BACKGROUND

Technical Field

This disclosure relates to sensor circuits in computer systems and more particularly to radio frequency sensor circuit operation.

Description of the Related Art

Modern computer systems may perform certain tasks or operations in response to changes in the environments, in which the computer systems are located. For example, changes in ambient light may result in a computer system adjusted brightness of a display. Additionally, changes in temperature may result in a computer system adjusting a level processing being performed in order to maintain the computer system within designated thermal limits. In some cases, rapid changes in acceleration may result in the computer system taking certain actions to prevent damage to movable parts within the computer system.

To react to changes in environment, a computer system may include multiple sensor circuits designed to detect various effects or situations. For example, such sensor circuit may include temperature sensors, acceleration sensors, ambient light sensors, and the like. The outputs of such sensor circuits may be polled by a processor or controller included in the computer system to determine what actions to perform.

Sensor circuits, such as those described above, may include any suitable combination of logic circuits, analog circuit, radio frequency circuits, and the like. In some cases, the sensor circuits may employ passive sensing techniques. Other sensor circuits may employ active sensing by transmitting signals and monitoring any returning signals.

SUMMARY OF THE EMBODIMENTS

Various embodiments of a transceiver circuit are disclosed. Broadly speaking, a transceiver circuit may include first and second antennas, a transmitter circuit, and a receiver circuit. The transmitter circuit may be configured to store an identifier number and determine a plurality of codes using the identifier number. The transmitter circuit may also be configured to generate a transmit signal that includes a plurality of pulses, where a given one of the pulses includes a plurality of chirps each coded with a respective one of the plurality of codes, and broadcast the transmit signal using a first antenna. The receiver circuit may be configured to receive, using the second antenna, an echo signal that is a reflected version of the transmit signal, and generate an output signal using the echo signal. In another embodiment, the transmitter circuit may be further configured to generate a modulation signal whose phase shifts each of a plurality of sub-periods of the period of the given one of the pulses, where a number of sub-periods of the plurality of sub-periods corresponds to a number of codes included in the plurality of codes, and generate the transmit signal using the modulation signal and a baseband signal. In a different embodiment, the transmitter circuit may include a control circuit, a digital-to-analog converter circuit, and an amplifier circuit. The control circuit may be configured to generate a plurality of bits representative of the plurality of chirps, and the digital-to-analog converter circuit may be configured to convert the plurality of bits into an analog signal. The amplifier circuit may be configured to generate the transmit signal using the analog signal.

Figure 1:
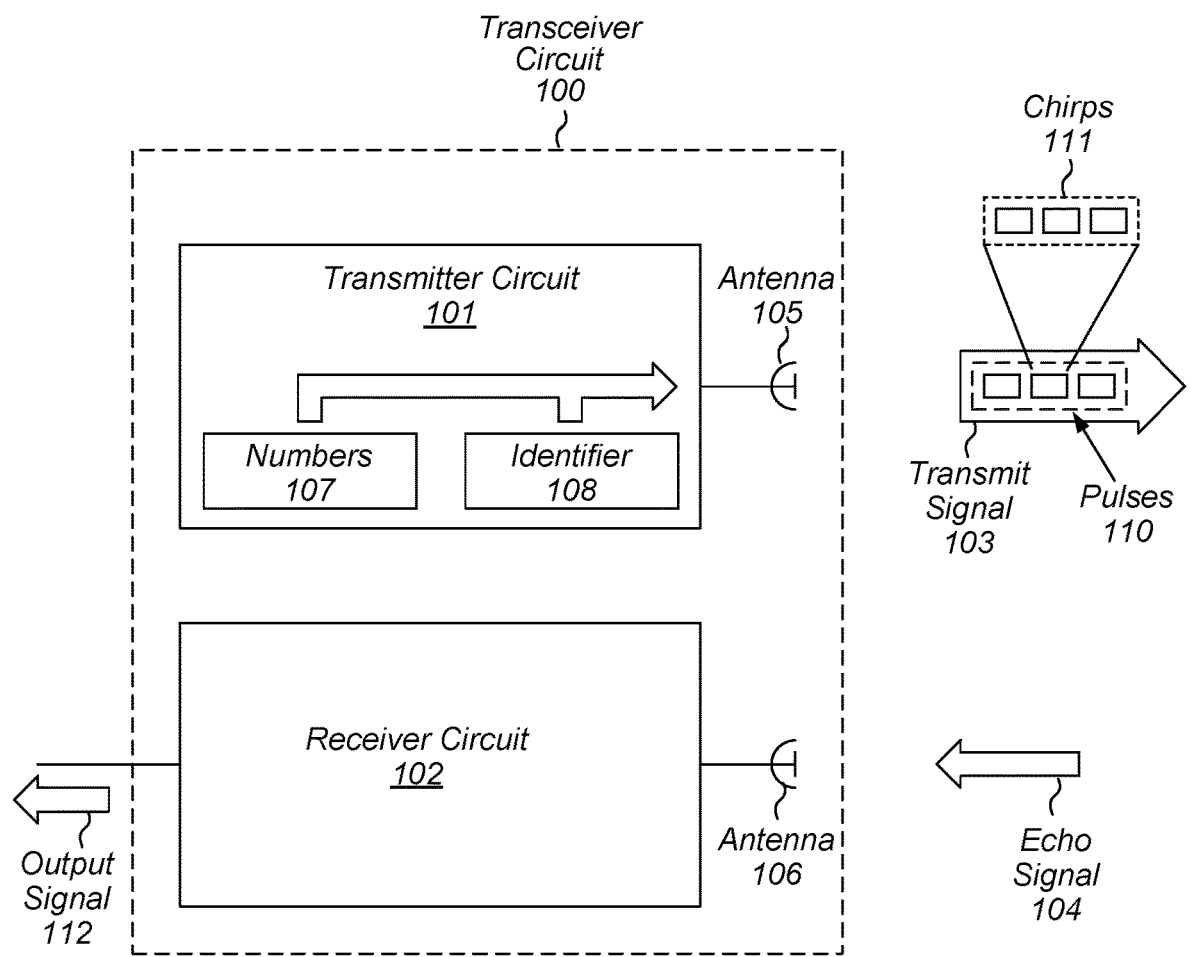
FIG. 1 is a block diagram of an embodiment of a transceiver circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Many computer systems come equipped with various sensors that allow such computer systems to detect various effects and situations. For example, some mobile computer systems include sensors for detecting acceleration and deceleration, ambient temperature, humidity, and the like. In some cases, computer systems include sensors to determine a distance to a particular object. For example, sensors may be employed by a mobile computer system to determine a distance to a desktop computer system, router, etc.

Sensors used to determine a distance or range to an object (referred to as Depth Sensing and Mapping or "DSM") may often employ radio frequency (RF) signals. Such signals may be transmitted and echo signals, i.e., versions of the transmitted signals reflected off of the object, may be received and analyzed to determine the distance or range to the object.

A determined distance or range to an object may be used to adjust operation of a computer system. For example, some computer systems may be capable of broadcasting signals at a power output that exceeds Maximal Permissible Exposure (MPE) regulatory limits. If a live object is detected using DSM and found to be within a particular distance of a computer system, the output power of the computer system may be adjusted to comply with regulatory limits.

Various techniques, e.g., linear frequency modulation (LFM), may be employed to perform DSM. In some cases, the selection of a waveform used for DSM can affect the accuracy and resolution of a distance to an object. Additionally, the ability to distinguish between different objects and the ability of different computer systems to perform DSM within proximity of each other may be affected.

When multiple computer systems simultaneously employ LFM, different techniques may be employed to allow the different computer systems prevent the different computer systems from interfering with each other. For example, each computer system may employ a different slope or a different coding scheme. In some cases, the start time of transmission of RF pulses between the various computer systems may be coordinated. Use of such techniques, however, can result in different computer systems having different processing gains, and different delay profiles. The embodiments illustrated in the drawings and described below may provide techniques operating a sensor circuit that employs LFM using orthogonal coding that allows different computer systems to have the same processing gain and a common delay profile.

A block diagram of a sensor circuit is depicted in FIG. 1. As illustrated, transceiver circuit 100 includes transmitter circuit 101, receiver circuit 102, antenna 105, and antenna 106.

Transmitter circuit 101 is configured to store identifier 108 and determine numbers 107 using identifier 108. In various embodiments, identifier 108 may be an integer that is unique to transceiver circuit 100. In some applications, different transceiver circuits may store different identifier numbers. By employing different identifier number, multiple transmitter circuits can perform DSM within a given proximity, without interfering with each other, since each transmitter circuit will generate different codes based on their respective identifier number.

Transmitter circuit 101 is further configured to generate transmit signal 103. As depicted, transmit signal 103 includes pulses 110. As used herein, a pulse references to a transition of a signal, e.g., transmit signal 103, from a minimum frequency value to a maximum frequency value. A given one of pulses 110 includes chirps 111, each coded with a respective one of numbers 107. As described below in more detail, a given one of numbers 107 may be a complex number indicative of a phase shift for a corresponding chirp. In various embodiments, numbers 107 may be stored in transmitter circuit 101 in a binary or other suitable representation.

As used and described herein, a chirp is a particular sub-period of a period of a pulse that is encoded with a particular number. A pulse can include any suitable number of chirps, and each chirp within a pulse may have a different phase relationship to the other chirps within the pulse. In some embodiments, the number of chirps included in chirps 111, and the number numbers included in numbers 107 may be based, at least in part, on identifier 108. Transmitter circuit 101 is also configured to broadcast transmit signal 103 using antenna 105. In various embodiments, once broadcast, transmit signal 103 may propagate as electromagnetic waves.

Receiver circuit 102 is configured to receive, using antenna 106, echo signal 104 that is a reflected version of transmit signal 103. Such a reflected version of transmit signal 103 may result from transmit signal 103 reflecting from some object, e.g., a person, a wall, etc. In some cases, echo signal 104 may have a different magnitude and phase than transmit signal 103 resulting from the reflection. In some embodiments, receiver circuit 102 may be further configured to generate output signal 112 using echo signal 104. As described below in more detail, different types of receiver circuits may be employed. Such receiver circuits may be configured to perform various operations to generate output signal 112 including, but not limited to, amplifying and filtering echo signal 104.

It is noted that although transmitter circuit 101 and receiver circuit 102 are depicted as employing respective antennas, in other embodiments, transmitter circuit 101 and receiver circuit 102 may share a common antenna. In such cases, transmitter circuit 101 and receiver circuit 102 may time domain multiplex their use of the common antenna. Moreover, in some embodiments, multiple transmitter circuits, receiver circuits, and antennas may be employed. The use of multiple transmitter circuits, receiver circuits, and antennas may allow for various performance enhancements, such as improved signal-to-noise ratio (SNR), employ different antenna patterns, spatial localization of echo signals, and the like.

Figure 2:
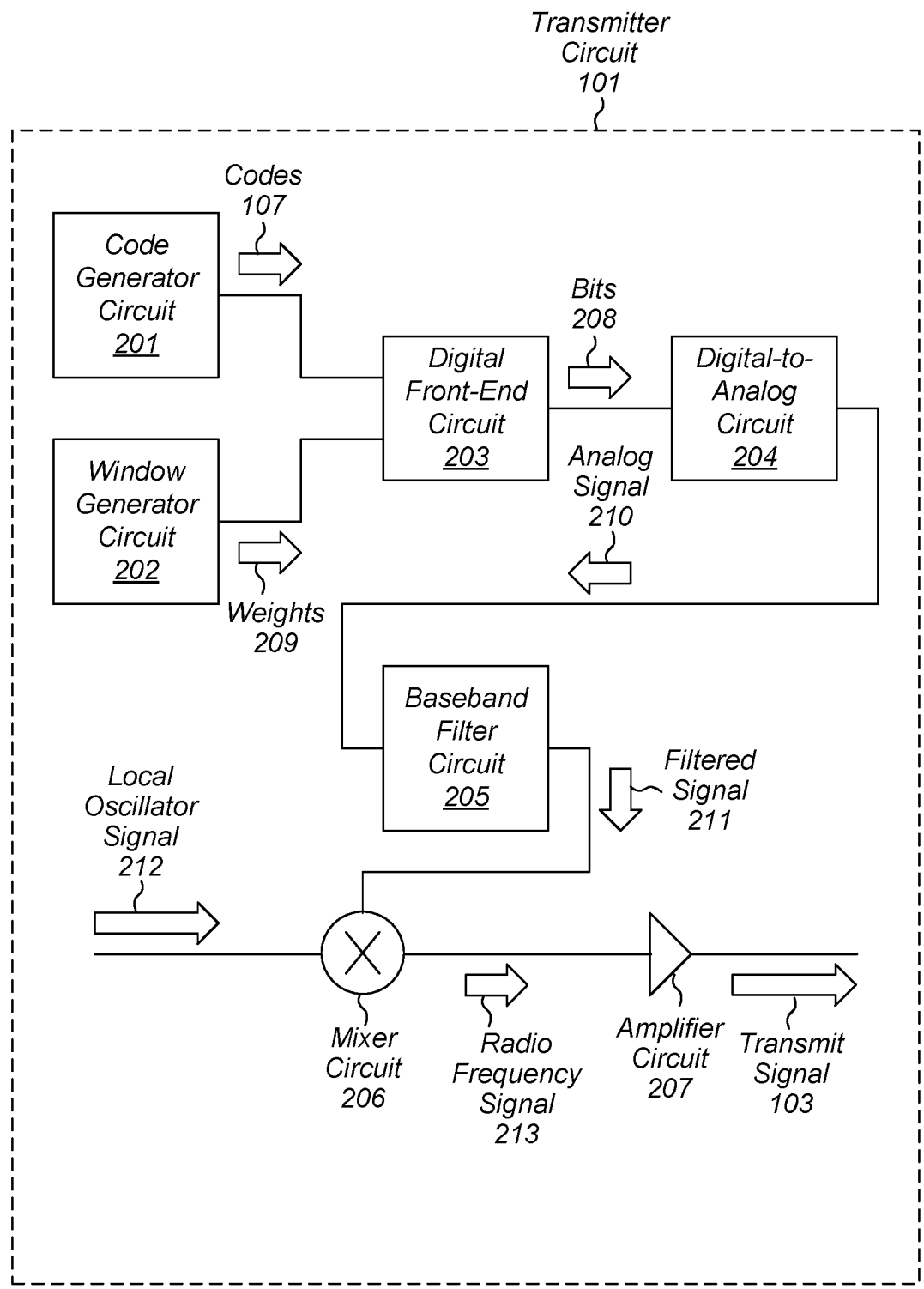
FIG. 2 illustrates a block diagram of an embodiment of a transmitter circuit.

Turning to FIG. 2, an embodiment of transmitter circuit 101 is depicted. As illustrated, transmitter circuit 101 includes code generator circuit 201, window generator circuit 202, digital front-end circuit 203, digital-to-analog converter circuit 204, baseband filter circuit 205, mixer circuit 206, and amplifier circuit 207.

Code generator circuit 201 is configured to generate numbers 107 using identifier 108. In some cases, code generator circuit 201 may include a register or other suitable circuit configured to store identifier 108. In various embodiments, code generator circuit 201 may generate numbers 107 according to a particular one of various equations. For example, numbers 107 may be generated using Equation 1, where i is identifier 108 and T is the period of a pulse. It is noted that in various embodiments, the product of βT is relatively prime to i. As illustrated in Equation 1, numbers 107 are a function of time, with a different expression for each of multiple sub-periods included in the period of the pulse. For example, during the first sub-period, the generated code is 1 times the coefficient portion of the function. In various embodiments, the number of sub-periods within the period of the pulse is function of identifier 108.

$$s(t) = \frac{1}{\sqrt{T}} e^{ji\pi\beta T(\frac{t}{T})^2} e^{-jsgn(i)\pi\beta t} \quad (1)$$

$$\begin{cases} 1, & 0 \leq t < \frac{T}{|i|} \\ e^{-j \cdot sgn(i) 2\pi\beta(t + (i-1)mod2\frac{T}{2i})}, & \frac{T}{|i|} \leq t < 2\frac{T}{|i|} \\ e^{-j \cdot sgn(i) 4\pi\beta(t + (i-1)mod2\frac{T}{2i})}, & 2\frac{T}{|i|} \leq t < 3\frac{T}{|i|} \\ e^{-j \cdot sgn(i) \cdot 2(i-1)\pi\beta(t + (i-1)mod2\frac{T}{2i})} & T - \frac{T}{|i|} \leq t < T \end{cases}$$

In some embodiments, a given value of numbers 107 may be expressed as a plurality of bits generated by code generator circuit 201, which are sent to digital front-end circuit 203. In some cases, code generator circuit 201 may be a particular embodiment of a state machine or other suitable sequential logic circuit. Alternatively, code generator circuit 201 may be a general-purpose processor configured to execute software or program instruction.

Window generator circuit 202 is configured to generate a plurality of weights that made be applied to different frequency components within a particular pulse included in transmit signal 103, scaling the amplitudes of the different frequency components. In various embodiments, window generator circuit 202 may generate weights 209 according to a particular equation, such as Equation 2, where i is identifier 108, and ak is a series of values selected to suppress particular sidelobes.

$$w(t) = \sum_{k=0}^{K} a_k \cos\left(2\pi i k \frac{t}{T} - \pi k\right) \quad (2)$$

The use of weights 209 allows for a reduction in the range of sidelobes of a delay profile used by a filter circuit included in receiver circuit 102. It is noted that the reduction in the sidelobes at the output of the filter circuit may result in a wider main lobe. Like code generator circuit 201, window generator circuit 202 may be a sequential logic circuit, state machines, or general-purpose processor.

Digital front-end circuit 203 may, in various embodiments, be a particular embodiment of a state machine, sequential logic circuit, or general-purpose processor configured to generate bits 208 using numbers 107 and weights 209. In various embodiments, bits 208 may include a plurality of multi-bit words, each of which corresponds to a particular value of transmit signal 103 at a given point in time. The multi-bits words may include any suitable number of bits.

Digital-to-analog converter circuit 204 is configured to generate analog signal 210 using bits 208. In some cases, a magnitude of analog signal 210, at a particular point in time, may be based, at least in part, on a particular value of bits 208. In various embodiments, digital-to-analog converter circuit 204 may be a particular embodiment of a switched resistor circuit, a switched capacitor circuit, a switched current circuit, or any other suitable digital-to-analog converter circuit architecture.

Baseband filter circuit 205 is configured to reject or attenuate one or more undesired frequency components included in analog signal 210 to generate filtered signal 211. In various embodiments, baseband filter circuit 205 may include any suitable combination of inductors, capacitors, or other passive circuit elements. Alternatively, baseband filter circuit 205 may include an amplifier or other active circuit elements configured to attenuate the undesired frequency components.

Mixer circuit 206 is configured to generate radio-frequency signal 213 using filtered signal 211 and local oscillator signal 212. In various embodiments, mixer circuit 206 may be configured to generate radio-frequency signal 213 such that a frequency of radio-frequency signal 213 is a sum of respective frequencies of filtered signal 211 and local oscillator signal 212. In some embodiments, mixer circuit 206 may be a passive mixer circuit that includes passive circuit elements, such as diodes or other non-linear circuit elements. Alternatively, mixer circuit 206 may be an active circuit that includes an amplifier circuit, or other active circuit element, configured to amplify filter signal 211.

Amplifier circuit 207 is configured to amplify radio-frequency signal 213 to generate transmit signal 103. In some cases, amplifier circuit 207 is connected to antenna 105, which converts transmit signal 103 from a time-varying voltage and/or current, to electromagnetic waves. In various embodiments, amplifier circuit 207 may be a particular embodiment of a single-ended amplifier circuit, a differential amplifier circuit, or any other suitable amplifier circuit.

Figure 3:
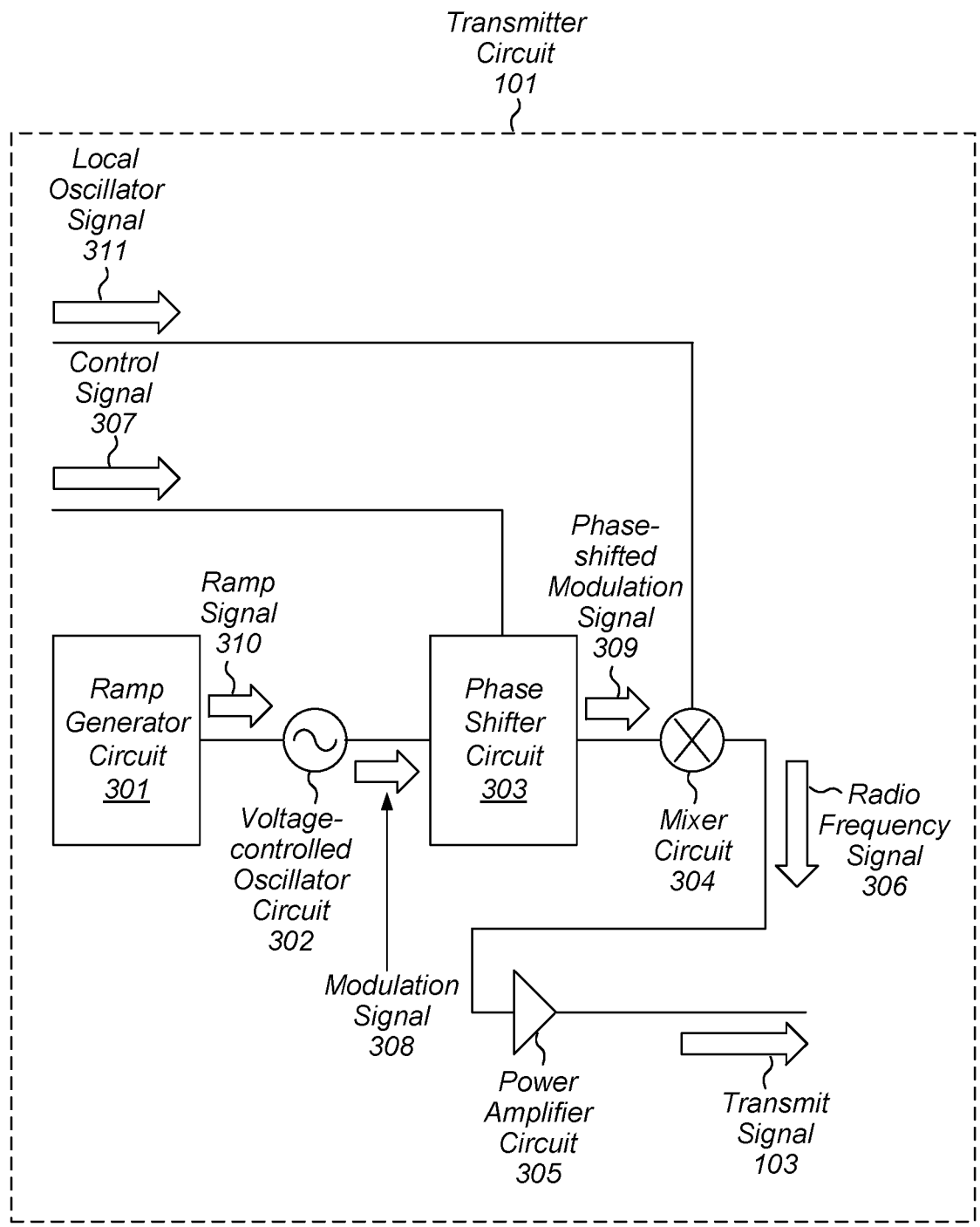
FIG. 3 illustrates a block diagram of another embodiment of a transmitter circuit.

As described above in regard to FIG. 2, the encoding of individual chirps may be accomplished in the digital domain. In some cases, similar encoding may be accomplished in the analog domain. A different embodiment of transmitter circuit 101 is depicted in FIG. 3. As illustrated, the embodiment of transmitter circuit 101 depicted in FIG. 3 includes ramp generator circuit 301, voltage-controlled oscillator circuit 302, phase shifter circuit 303, mixer circuit 304, and power amplifier circuit 305.

Ramp generator circuit 301 is configured to generate ramp signal 310. In various embodiments, ramp generator circuit 301 may be configured to transition ramp signal 310 from a first voltage level to a second voltage level that is greater than the first voltage level during a particular period of time. During another period of time, equal in duration to the particular period of time, ramp generator circuit 301 may be configured to transition ramp signal 310 from the second voltage level to the first voltage level.

In some cases, ramp generator circuit 301 may include a capacitor that is charged and discharged using a particular current. Alternatively, ramp generator circuit 301 may include a counter circuit whose count value is converted to ramp signal 310 using a digital-to-analog converter circuit.

Voltage-controlled oscillator circuit 302 is configured to generate modulation signal 308 using ramp signal 310. In various embodiments, voltage-controlled oscillator circuit 302 is configured to increase a frequency of modulation signal 308 as a voltage level of ramp signal 310 increases, and decrease the frequency of modulation signal 308 as the voltage level of ramp signal 310 decreases. Voltage-controlled oscillator circuit 302 may be implemented according to one of various design styles. For example, in some embodiments, voltage-controlled oscillator circuit 302 may include a ring of current-starved inverters controlled by the voltage level of ramp signal 310.

Phase shifter circuit 303 is configured to phase shift modulation signal 308 to generate phase-shifted modulation signal 309 using control signal 307. In various embodiments, control signal 307 may be based, at least in part, on numbers 107, and may change the phase shift imparted to modulation signal 308 every T/|i| seconds, where T is the period of a pulse, i is the integer specified in Equation 1, where each pulse includes i chirps coded with respective phases. In some cases, the phases may be defined according to Equation 1. Phase shifter circuit 303 may, in some embodiments, be either an active or passive circuit configured to delay modulation signal 308 by different periods of time based on control signal 307.

Mixer circuit 304 is configured to increase a frequency of phase-shifted modulation signal 309 using local oscillator signal 311 to generate radio frequency signal 306. The process of increasing a frequency of a signal in this fashion is commonly referred to as "up-converting" a signal. In various embodiments, mixer circuit 304 may be configured to generate radio frequency signal 306 such that the frequency of radio frequency signal 306 is a sum of a frequency of phase-shifted modulation signal 309 and local oscillator signal 311. Mixer circuit 304 may include any suitable combination of passive and active circuit elements, such as, diodes, capacitors, transistors, and the like. It is noted that in some cases, up-converting of phase-shifted modulation signal 309 may be accomplished using voltage-controlled oscillator circuit 302. Although mixer circuit 304 is depicted as up-converting phase-shifted modulation signal 309, in other embodiments, mixer circuit 304 may switched with phase shifter circuit 303, so that mixer circuit 304 up-converts modulation signal 308, and phase shifter phase shifts an up-converted version of modulation signal 308.

Power amplifier circuit 305 is configured to amplify radio frequency signal 306 to generate transmit signal 103. In various embodiments, an output of power amplifier circuit 305 may be coupled to antenna 105, or any other suitable antenna structure, configured to convert the changes in voltage and current of transmit signal 103 to electromagnetic waves. Power amplifier circuit 305 may, in some embodiments, be a particular embodiment of a single-ended or differential amplifier circuit.

Figure 4:
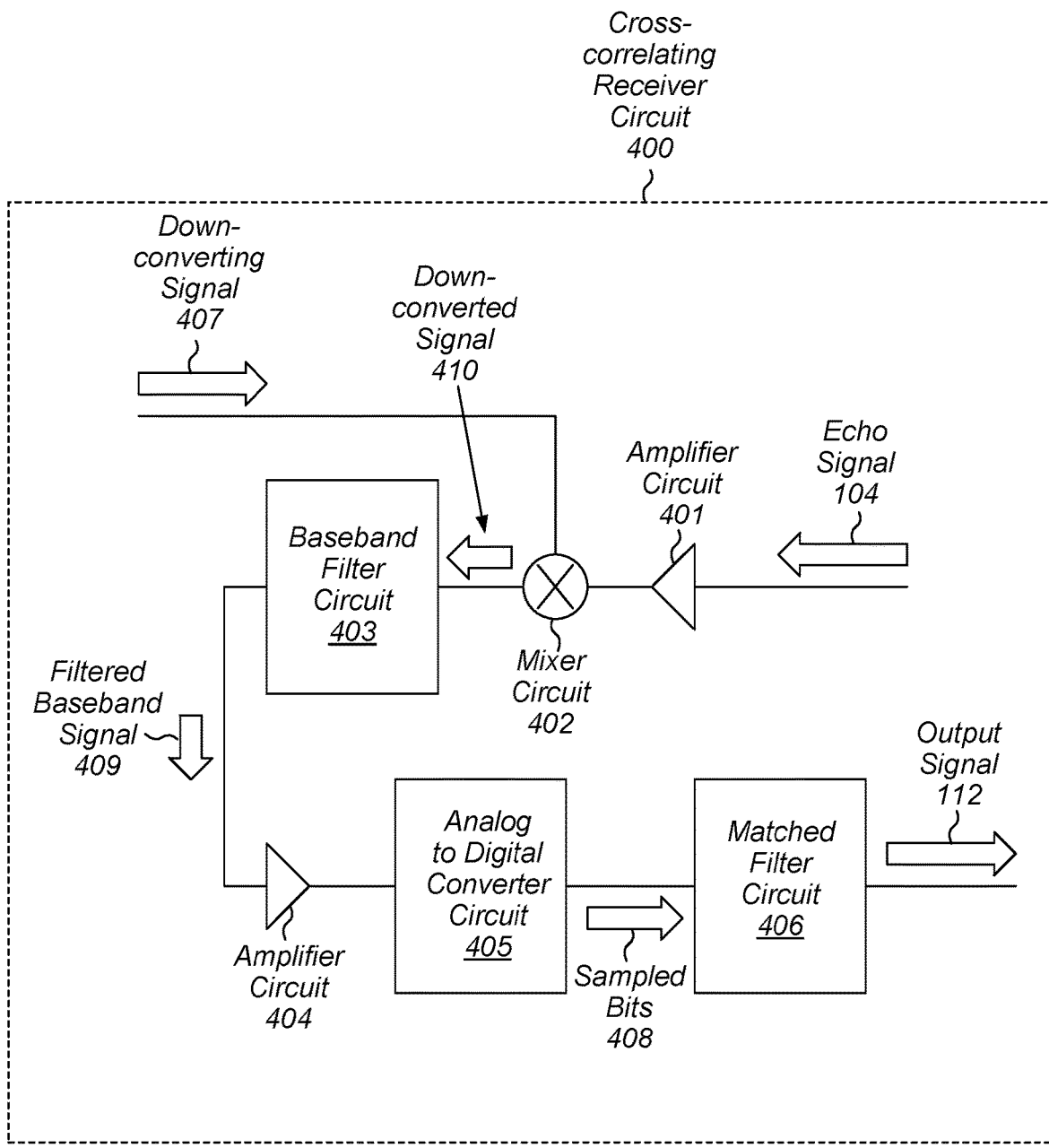
FIG. 4 illustrates a block diagram of a cross-correlating receiver circuit.

As mentioned above, different types of receiver circuits may be employed. An embodiment of cross-correlation receiver circuit is depicted in FIG. 4. In various embodiments, cross-correlation receiver circuit 400 may correspond to receiver circuit 102 as depicted in FIG. 1. As illustrated, cross-correlation receiver circuit 400 includes amplifier circuit 401, mixer circuit 402, baseband filter circuit 403, amplifier circuit 404, analog-to-digital converter circuit 405, and matched filter circuit 406.

Amplifier circuit 401 is configured to amplify echo signal 104, and provide an amplified version of echo signal 104 to mixer circuit 402. Amplifier circuit 401 may, in other embodiments, be single-ended and generate an output signal based on, at least in part, the magnitude of echo signal 104 relative to a ground reference or ground supply signal. In other cases, echo signal 104 may be differentially encoded as a difference in voltage level between two signal lines or wires. In such cases, amplifier circuit 401 may be a differential amplifier configured to generate its output signal based on the difference in voltage level between the voltage levels.

Mixer circuit 402 is configured, using down-converting signal 407, to down convert an amplified version of echo signal 104 (generated by amplifier circuit 401) to generate down-converted signal 410. In various embodiments, down-converting signal 407 may be generated by a local oscillator circuit (not shown) or may be received from an oscillator circuit located elsewhere within transceiver circuit 100. In some embodiments, mixer circuit 402 may be a passive mixer circuit that includes passive circuit elements, such as diodes or other non-linear circuit elements. Alternatively, mixer circuit 402 may be an active mixer circuit that may include an amplifier, or other suitable circuit, configured to provide additional drive strength to down-converted signal 410.

Baseband filter circuit 403 is configured to reject or attenuate one or more undesired frequency components included in down-converted signal 410 to generate filtered baseband signal 409. In various embodiments, baseband filter circuit 403 may include any suitable combination of inductors, capacitors, or other passive circuit elements. Alternatively, baseband filter circuit 403 may include an amplifier or other active circuit element configured to attenuate the undesired frequency components.

Amplifier circuit 404 is configured to amplify filtered baseband signal 409. In various embodiments, amplifier circuit 404 may be a particular embodiment of a single-ended amplifier circuit, differential amplifier circuit, or any other suitable amplifier circuit.

Analog-to-digital converter circuit 405 is configured to generate sampled bits 408 using an amplified version of filtered baseband signal 409 generated by amplifier circuit 404. In various embodiments, analog-to-digital converter circuit 405 may sample the amplifier version of filtered baseband signal 409 at various points in time to generate sampled bits 408. It is noted that a sampling rate used by analog-to-digital converter circuit 405 may be sufficiently high at least twice the bandwidth of amplified version of filtered baseband signal 409.

Matched filter circuit 406 is configured to generate output signal 112 using sampled bits 408. In various embodiments, matched filter circuit 406 has response that is the complex conjugate of the time inverse of the response to transmitter circuit 101. As described below in more detail, matched filter circuit 406 may be configured to translate sampled bits 408 into the frequency domain, operate on the translated bits, and then translate resultant bits back into the time domain. Alternatively, in some embodiments, matched filter circuit 406 may be configured to perform the above-referenced convolution in the time domain. It is noted that although a single matched filter circuit is depicted in FIG. 4, in other embodiments, any suitable number of matched filter circuits may be employed. In such cases, the different matched filter circuits may use different identifier numbers, e.g., identifier 108, to discriminate between different received echo signals.

Figure 5:
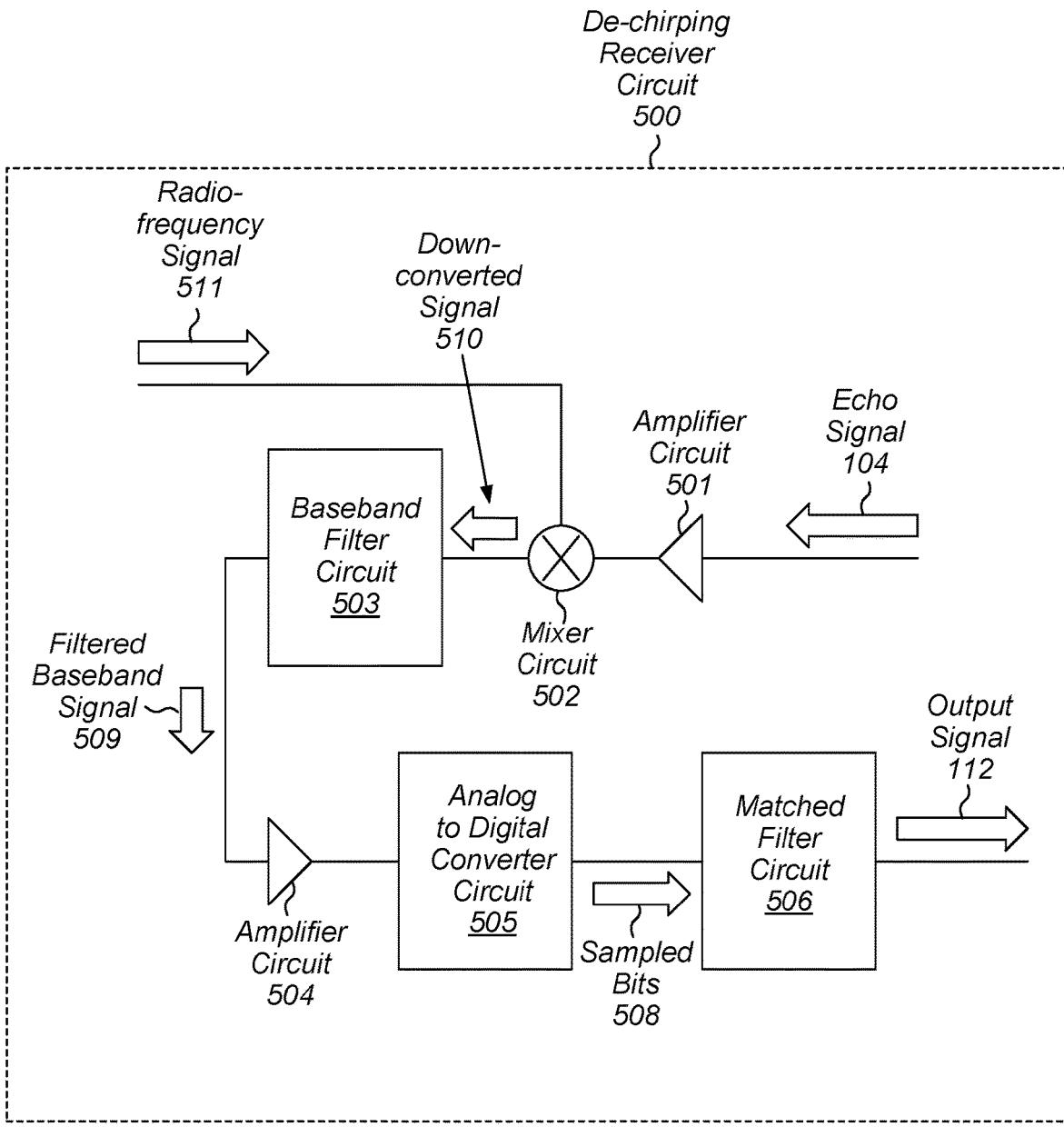
FIG. 5 illustrates a block diagram of a de-chirping receiver circuit.

Turning to FIG. 5, a block diagram of a de-chirping receiver circuit is depicted. As illustrated, de-chirping receiver circuit 500 includes amplifier circuit 501, mixer circuit 502, baseband filter circuit 503, amplifier circuit 504, analog-to-digital converter circuit 505, and matched filter circuit 506.

Amplifier circuit 501 is configured to amplify echo signal 104, and provide an amplified version of echo signal 104 to mixer circuit 502. Amplifier circuit 501 may, in other embodiments, be single-ended and generate an output signal based on, at least in part, the magnitude of echo signal 104 relative to a ground reference or ground supply signal. In other cases, echo signal 104 may be differentially encoded as a difference in voltage level between two signal lines or wires. In such cases, amplifier circuit 401 may be a differential amplifier configured to generate its output signal based on the difference in voltage level between the voltage levels.

Mixer circuit 502 is configured, using radio-frequency signal 511, to down convert an amplified version of echo signal 104 (generated by amplifier circuit 401) to generate down-converted signal 510. In various embodiments, radio-frequency signal 511 may correspond to radio-frequency signal 213 or 306. By employing radio-frequency signal 511 instead of a local oscillator signal, mixer circuit 502 performs an analog "de-chirping" operation on the amplified version of echo signal 104.

In some embodiments, mixer circuit 502 may be a passive mixer circuit that includes passive circuit elements, such as diodes or other non-linear circuit elements. Alternatively, mixer circuit 502 may be an active mixer circuit that may include an amplifier, or other suitable circuit, configured to provide additional drive strength to down-converted signal 510.

Baseband filter circuit 503 is configured to reject or attenuate one or more undesired frequency components included in down-converted signal 510 to generate filtered baseband signal 509. In various embodiments, baseband filter circuit 503 may include any suitable combination of inductors, capacitors, or other passive circuit elements. Alternatively, baseband filter circuit 503 may include an amplifier or other active circuit element configured to attenuate the undesired frequency components.

Amplifier circuit 504 is configured to amplify filtered baseband signal 509. In various embodiments, amplifier circuit 504 may be a particular embodiment of a single-ended amplifier circuit, differential amplifier circuit, or any other suitable amplifier circuit.

Analog-to-digital converter circuit 505 is configured to generate sampled bits 408 using an amplified version of filtered baseband signal 509 generated by amplifier circuit 504. In various embodiments, analog-to-digital converter circuit 505 may sample the amplifier version of filtered baseband signal 509 at various points in time to generate sampled bits 508. It is noted that a sampling rate used by analog-to-digital converter circuit 505 may be sufficiently high at least twice the bandwidth of amplified version of filtered baseband signal 509.

Matched filter circuit 506 is configured to generate output signal 112 using sampled bits 508. In various embodiments, matched filter circuit 506 has response that is the complex conjugate of the time inverse of the response to transmitter circuit 101. As described below in more detail, matched filter circuit 506 may be configured to perform a convolution operation on sampled bits 508 in either the frequency domain or time domain. It is noted that although a single matched filter circuit is depicted in FIG. 5, in other embodiments, any suitable number of matched filter circuits may be employed. In such cases, the different matched filter circuits may use different identifier numbers, e.g., identifier 108, to discriminate between different received echo signals.

Depending upon a type of receiver circuit used, different matched filter circuits may be employed. An embodiment of matched filter circuit for a cross-correlation receiver, e.g., cross-correlation receiver circuit 400, is depicted. As illustrated, matched filter circuit 406 includes vector integrator circuit 601, fast Fourier transform circuit 602, filter and weighting circuit 603, and inverse fast Fourier transform circuit 604.

Vector integrator circuit 601 is configured to perform an integration operation on sampled bits 408 to generate integrated data 606. In various embodiments, the integration operation may include accumulating values for different bit positions within sampled bits 408 over a particular period of time. Vector integrator circuit 601 may be a particular embodiment of a state machine, sequential logic circuit, or general-purpose processor circuit.

Fast Fourier transform circuit 602 is configured to translate integrated data 606 from the time domain to a representation in the frequency domain. In various embodiments, fast Fourier transform circuit 602 may be a particular embodiment of a dedicated sequential logic circuit, state machine, or general-purpose processor configured to generate the frequency domain representation of the output of vector integrator circuit 601 using any suitable discrete Fourier transform algorithms.

Figure 6:
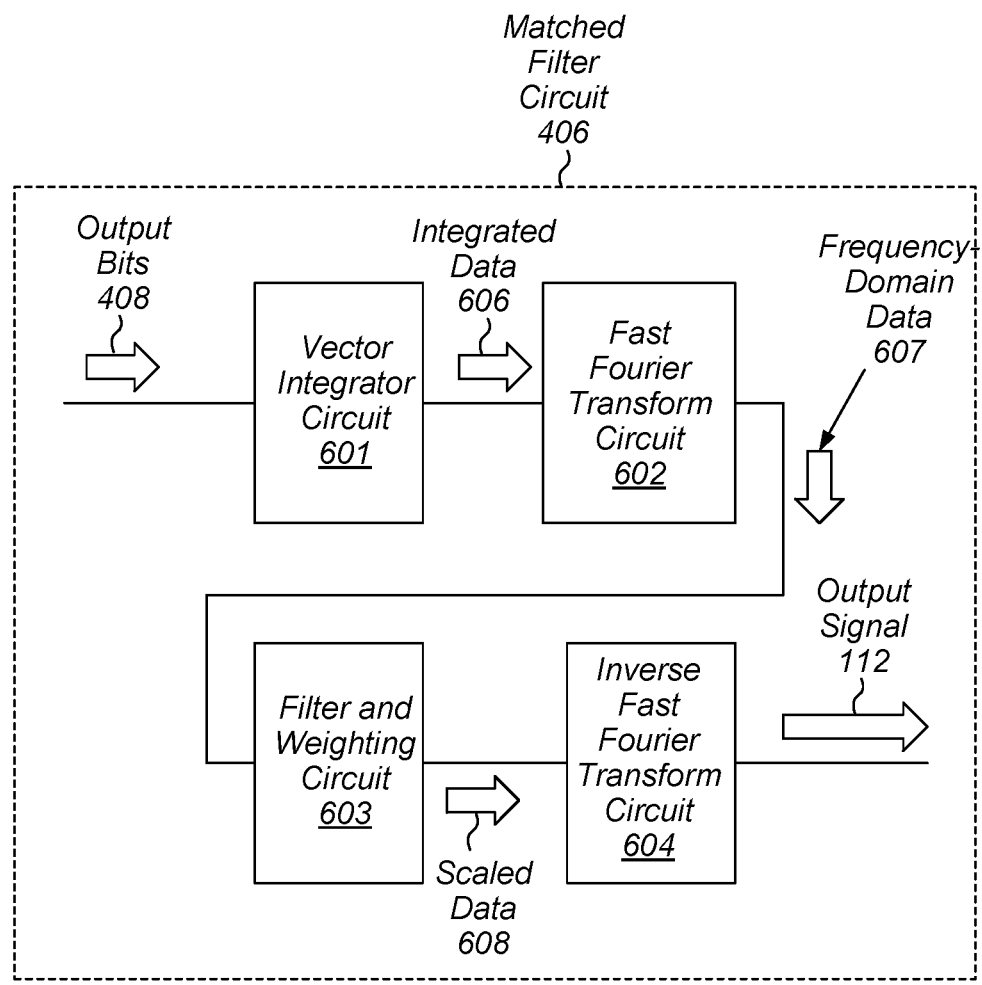
FIG. 6 illustrates a block diagram of a matched filter circuit for a cross-correlating receiver circuit.

Filter and weighting circuit 603 may be configured to scale respective amplitudes of multiple frequency components within particular ranges to suppress sidelobes of echo signal 104 to generate scaled data 608. In some embodiments, filtering and weighting circuit 603 may be further configured to attenuate one or more frequency components included in echo signal 104. In various embodiments, a similar weighting to that employed by window generator circuit 202 may be employed by filtering and weighting circuit 603. As with the other circuits depicted in FIG. 6, filtering and weighting circuit 603 may be a particular embodiment of a state machine, sequential logic circuit, or general-purpose processor circuit.

Inverse fast Fourier transform circuit 604 is configured to translate scaled data 608 from the frequency back to the time domain in order to generate output signal 112. As described below in more detail, output signal 112 may be used to determine a distance to an objected off of which transmit signal 103 was reflected to generate echo signal 104. In various embodiments, inverse fast Fourier transform circuit 604 may be a particular embodiment of a state machine, sequential logic circuit, or general-purpose processor circuit.

Figure 7:
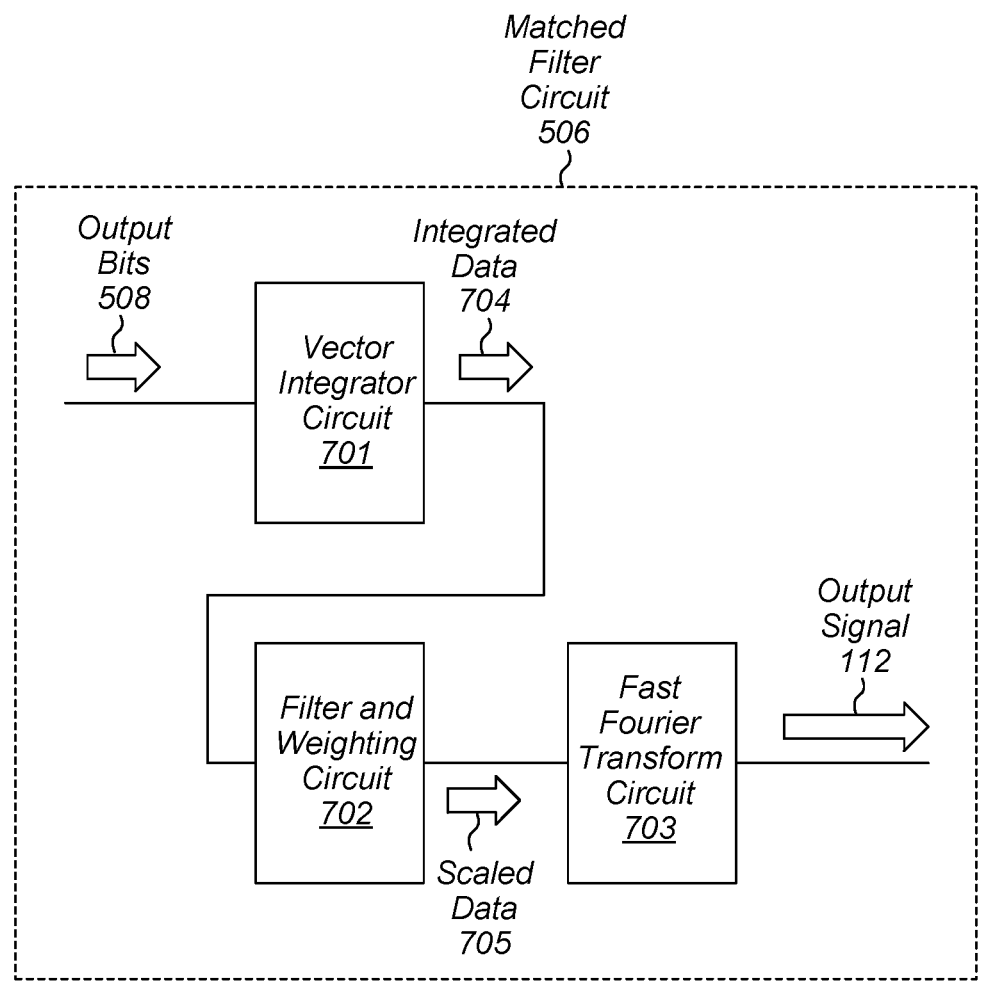
FIG. 7 illustrates a block diagram of a matched filter circuit for a de-chirping receiver circuit.

Turning to FIG. 7, a block diagram of an embodiment of a matched filter circuit for a de-chirping receiver is depicted. As illustrated, matched filter circuit 506 includes vector integrator circuit 701, weighting circuit 702, and fast Fourier transform circuit 703.

Vector integrator circuit 701 is configured to perform an integration operation on sampled bits 508 to generate integrated data 704. In various embodiments, the integration operation may include accumulating values for different bit positions within sampled bits 508 over a particular period of time. Vector integrator circuit 701 may be a particular embodiment of a state machine, sequential logic circuit, or general-purpose processor circuit.

Filter and weighting circuit 702 may be configured to scale respective amplitudes of multiple frequency components within particular ranges to suppress sidelobes of echo signal 104 to generate scaled data 705. In some embodiments, filtering and weighting circuit 702 may be further configured to attenuate one or more frequency components included in echo signal 104. In various embodiments, a similar weighting to that employed by window generator circuit 202 may be employed by filter and weighting circuit 702. As with the other circuits depicted in FIG. 7, filter and weighting circuit 702 may be a particular embodiment of a state machine, sequential logic circuit, or general-purpose processor circuit.

Fast Fourier transform circuit 703 is configured to operate on scaled data 705 to generate output signal 112. In various embodiments, fast Fourier transform circuit 703 may be a particular embodiment of a dedicated sequential logic circuit, state machine, or general-purpose processor configured to perform any suitable discrete Fourier transform algorithms for generating output signal 112.

Structures such as those shown in FIG. 2-7 for transmitting and receiving signals may be referred to using functional language. In some embodiments, these structures may be described as including "a means for storing an identifier number," "a means for determining a plurality of numbers using the identifier number," "a means for generating a transmit signal that includes a plurality of pulses, wherein a given one of the pulses includes a plurality of chirps each coded with a respective one of the plurality of numbers," "a means for broadcasting the transmit signal using a first antenna," "a means for receiving an echo signal that is a reflected version of the transmit signal," and "a means for generating an output signal using the echo signal."

The corresponding structure for "means for storing an identifier number" is code generator circuit 201 and its equivalents. The corresponding structure for "means for determining a plurality of numbers using the identifier number" is code generator circuit 201 and its equivalents. The corresponding structure for "means for generating a transmit signal that includes a plurality of pulses, wherein a given one of the pulses includes a plurality of chirps each coded with a respective one of the plurality of numbers" is code generator circuit 201, window generator circuit 202, digital front-end circuit 203, digital-to-analog converter circuit 204, ramp generator circuit 301, voltage-controlled oscillator circuit 302, phase shifter circuit 303, mixer circuit 304, and their equivalents. The corresponding structure for "means for broadcasting the transmit signal using a first antenna" is amplifier circuit 205, antenna 105, power amplifier circuit 305 and their equivalents. The corresponding structure for "means for receiving an echo signal that is a reflected version of the transmit signal" is antenna 106, amplifier circuit 401, and their equivalents. Mixer circuit 402, baseband filter circuit 403, amplifier circuit 404, analog-to-digital converter circuit 405, matched filter circuit 406, as well as their equivalents are the corresponding structure for "means for generating an output signal using the echo signal."

Figure 8:
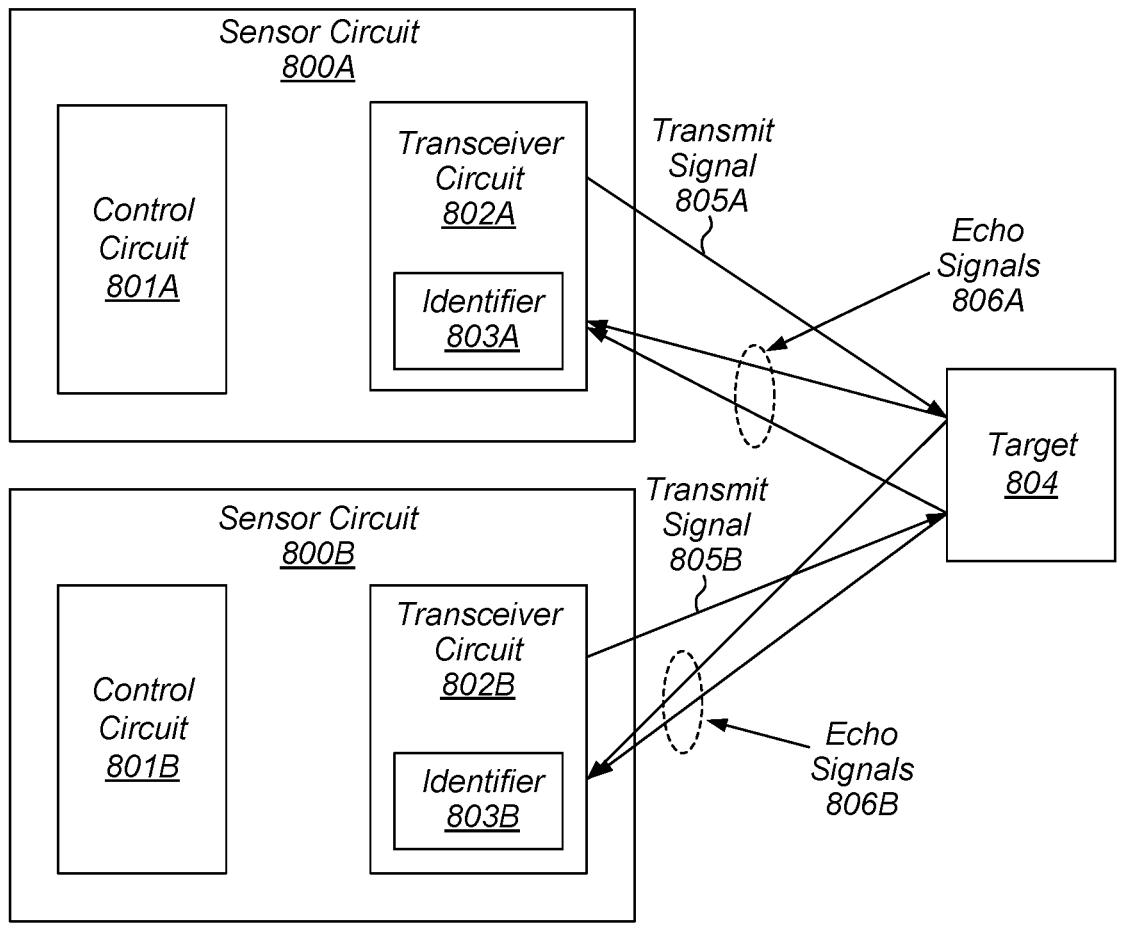
FIG. 8 illustrates a block diagram of multiple sensor circuits.

As noted above, orthogonal phase coding may allow multiple sensor circuits to operate in close proximity without interfering with each other. A block diagram of a multiple sensor circuits is depicted in FIG. 8. As illustrated, sensor circuit 800A includes control circuit 801A and transceiver circuit 802A, while sensor circuit 800B includes control circuit 801B and transceiver circuit 802B. In various embodiments, sensor circuit 800A and sensor circuit 800B may be located different distances from target 804. In some embodiments, target 804 may be a person, or other living object, a computer system, or any other suitable inanimate object.

Transceiver circuits 802A and 802B may, in various embodiments, correspond to transceiver circuit 101 as depicted in FIG. 1. Transceiver circuit 802A is configured to generate transmit signal 805A using identifier 803A, while transceiver circuit 802B is configured to generate transmit signal 805B using identifier 803B. It is noted that the values of identifier 803A and 803B may be different. For example, identifier 803A may be '1' while identified 803B may be '2.' Transceiver circuits 802A and 802B may generate transmit signals 805A and 805B, respectively, according to the coding specified in Equation 1, or other suitable coding equation.

Transceiver circuit 802A receives echo signals 806A, and transceiver circuit 802B receives echo signals 806B. Both echo signals 806A and 806B include reflected versions of both transmit signal 805A and transmit signal 805B. Since both transceiver circuit 802A and transceiver circuit 802B employ respective matched filters, the two transceiver circuits can discriminate between the different echo signals. For example, transceiver circuit 802A can ignore the components of echo signals 806A resulting from a reflection of transmit signal 805B. Such discrimination, allows sensor circuits 800A and 800B to operate near each other, without interfering with each other.

Control circuits 801A and 801B may, in various embodiments, be configured to determine a value of distance from sensor circuit 800A and sensor circuit 800B to target 804, respectively. As described below in more detail, such a determination may be based, at least in part, on the frequency of the echo signals 806A and 806B. In some embodiments, control circuits 801A and 801B may be configured to relay data indicative of the determined distance to other circuit blocks within a computer system via a communication bus. Additionally, control circuit 801A may be configured to activate or de-activate transceiver circuit 802A based, at least in part, on information received from other circuit blocks within the computer system. In a similar fashion, control circuit 801B may enable or disable transceiver circuit 802B. In various embodiments, control circuits 801A and 801B may be a particular embodiments of sequential logic circuits or state machines. Alternatively, control circuits 801A and 801B may each include a general-purpose processor circuit configured to execute software program instructions to perform desired functions.

Figure 9:
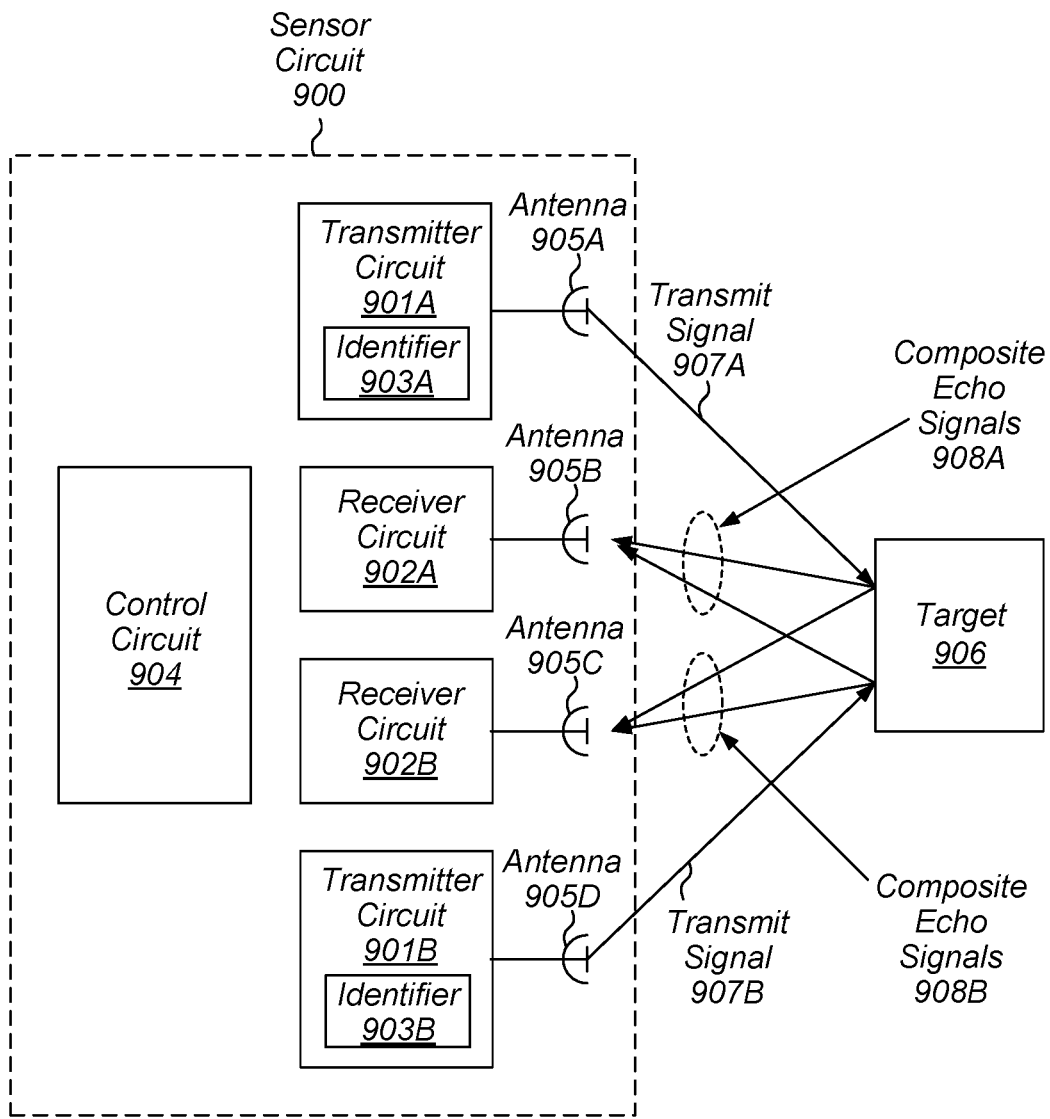
FIG. 9 illustrates a block diagram of a multiple-inputs multiple-outputs sensor circuit.

In addition to allowing multiple sensor circuits to work within close proximity to each other, as depicted in FIG. 8, transceiver circuit 100 may also be used in conjunction with multiple in multiple out (MIMO) systems. Such systems use multiple transmitter circuits, along with multiple receiver circuits, to improve the angle resolution of a sensor circuit by creating a virtual antenna array. In such a virtual array, a single antenna behaves as though it is multiple antennas, thereby improving the resolution of the sensor circuit. In order to for the signals transmitted by the different transmitter circuits to be orthogonal to each other, a variety of techniques may be employed. For example, time-division multiplexing, different chirp slopes, and the like may be employed. As described above, such techniques may suffer from loss of air-time usage, differences in processing gain, signal-to-noise ratio degradation, etc. An embodiment of a sensor circuit is depicted in FIG. 9 that employs the techniques described above to generate orthogonally coded waveforms without such penalties.

As illustrated, sensor circuit 900 includes transmitter circuits 901A-901C, receiver circuits 902A-902B, control circuit 904, and antennas 905A-905D. In various embodiments, transmitter circuits 901A-901C, may correspond to transmitter circuit 101 as depicted in FIG. 1, and receiver circuits 902A-902B may correspond to receiver circuit 102 as illustrated in FIG. 1.

Although only two transmitter circuits and two receiver circuits are depicted, in other embodiments any suitable number of transmitter circuits and receiver circuits may be employed. In some cases, the number of transmitter circuits and the number of receiver circuits may not be equal. It is noted that although each transmitter and receiver circuit is shown coupled to a respective one of antennas 905A-905D, in other embodiments, one or more of antennas 905A-905D may be shared between transmitter and receiver circuits in a time-domain multiplex fashion in order to reduce the number of antennas.

Transmitter circuit 901A is configured to generate transmit signal 907A using identifier 903A, and transmitter circuit 901B is configured to generate transmit signal 907B using identifier 903B. In various embodiments, identifier 903A and identifier 903B may be different values. For example, identifier 903A may be '1' while identifier 903B may be '2.' By using identifiers of different values, chirps include in transmit signal 907A and transmit signal 907B may be differently encoded according to Equation 1, or other suitable encoding equation.

Receiver circuit 902A receives composite echo signals 908A, while receiver circuit 902B receives composite echo signals 908B. Each of composite echo signals 908A and 908B include reflected versions of transmit signal 907A and transmit signal 907B. Each of receiver circuits 902A and 902B include multiple matched filter circuits for both transmit signal 907A and transmit signal 907B, so receiver circuits 902A and 902B may be configured to discriminate between the different reflected versions of transmit signals 907A and 907B. For example, receiver circuits 902A and 902B may be configured to differentiate between the transmissions of antenna 905A and the transmission from antenna 905B in other to build virtual antenna array of four elements in a signal transmitter.

Using respective outputs from receiver circuits 902A and 902B, control circuit 904 may be able to determine distance from sensor circuit 900 to target 906. In various embodiments, control circuit 904 may be a sequential logic circuit, state machine, or general-purpose processor configured to execute program or software instruction to implement a particular function.

Figure 10:
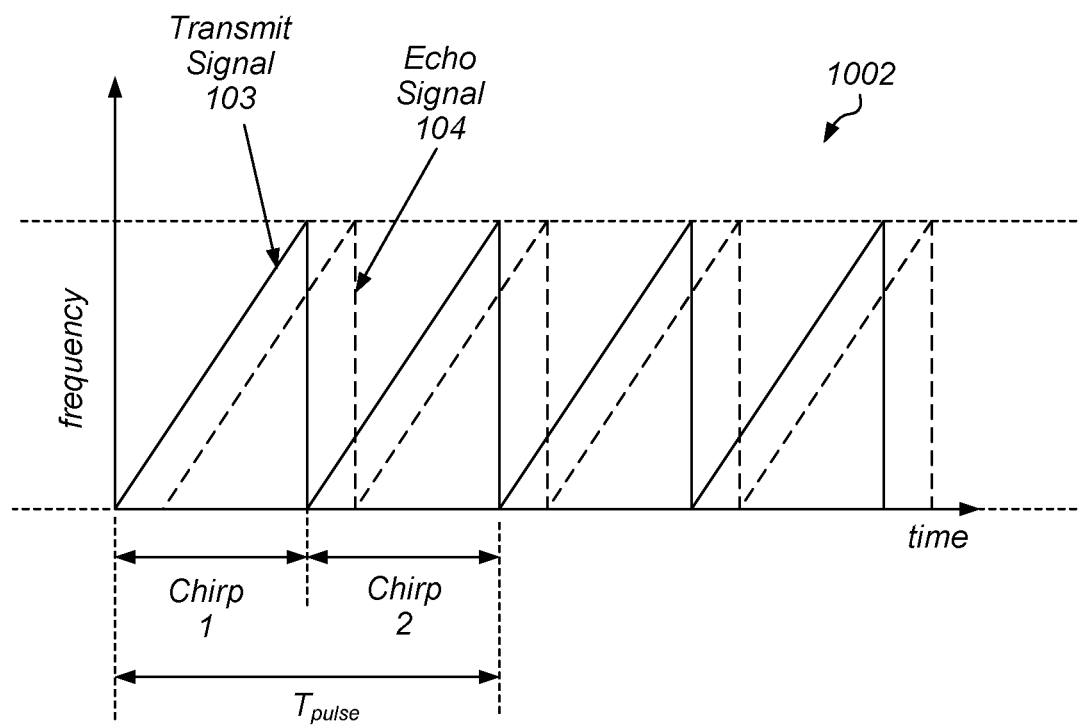
FIG. 10 illustrates example waveforms of a pulse including multiple chirps.

To further illustrate the relationship between transmit signal 103 and echo signal 104, example waveforms are depicted in FIG. 10. In various embodiments, transmit signal 103 may be emitted from either transmitter circuit 101, or the transmitter circuits include in either of sensor circuit 600 or sensor circuit 700. Transmit signal 103, is reflected off of a target, such as target 804 or target 906, to generate echo signal 104.

As illustrated, transmit signal 103 includes multiple pulses, each consisting of two chirps. In various embodiments, such a pulse may be generated for an identifier value of '2.' The frequency increases linearly with in each chirp, and the phase of each chirp is determined according to Equation 1. Although only two chips are shown as being included in the period of the pulse, in other embodiments, different identified values may be selected, resulting in different numbers of chirps within a pulse.

As transmit signal 103 is reflected off of a target, echo signal 104 is generated. Echo signal 104 appears as a delayed version of transmit signal 103 to a receiver circuit, e.g., receiver circuit 102. At a given point in time, there is a difference in frequency between transmit signal 103 and echo signal 104. By applying a matched filter, such as those described above, the difference in frequency between the down-converted version of echo signal 104 and a version of transmit signal 103 may be exploited to a distance to the target that generated the echo signal 104 by reflected transmit signal 103.

As described above, one of embodiments of the transceiver circuit 100 can convert the down converted version of echo signal 104 from the time domain into the frequency domain using a Fourier transform operation, thereby determining the baseband frequency. Distance to the target can then be determined using Equation 3, where $f_{BB}$ is the baseband frequency, $\Delta F$ is the difference between the maximum and minimum frequency values of transmit signal 103, $T_{chirp}$ is the period of a single sub-period (single chirp) used to generate transmit signal 103, $r_{target}$ is the distance to the target, and c is the speed of light. In various embodiments, transceiver circuit 100 may determine $f_{BB}$ and another circuit, e.g., control circuit 601A, may perform a calculation to determine $r_{target}$, while in other embodiments, transceiver circuit 100 may also determine $r_{target}$ once the determination of $f_{BB}$ has been made.

$$f_{BB} = \frac{\Delta F}{T_{chirp}} \frac{2 r_{target}}{c} \qquad (3)$$

Figure 11:
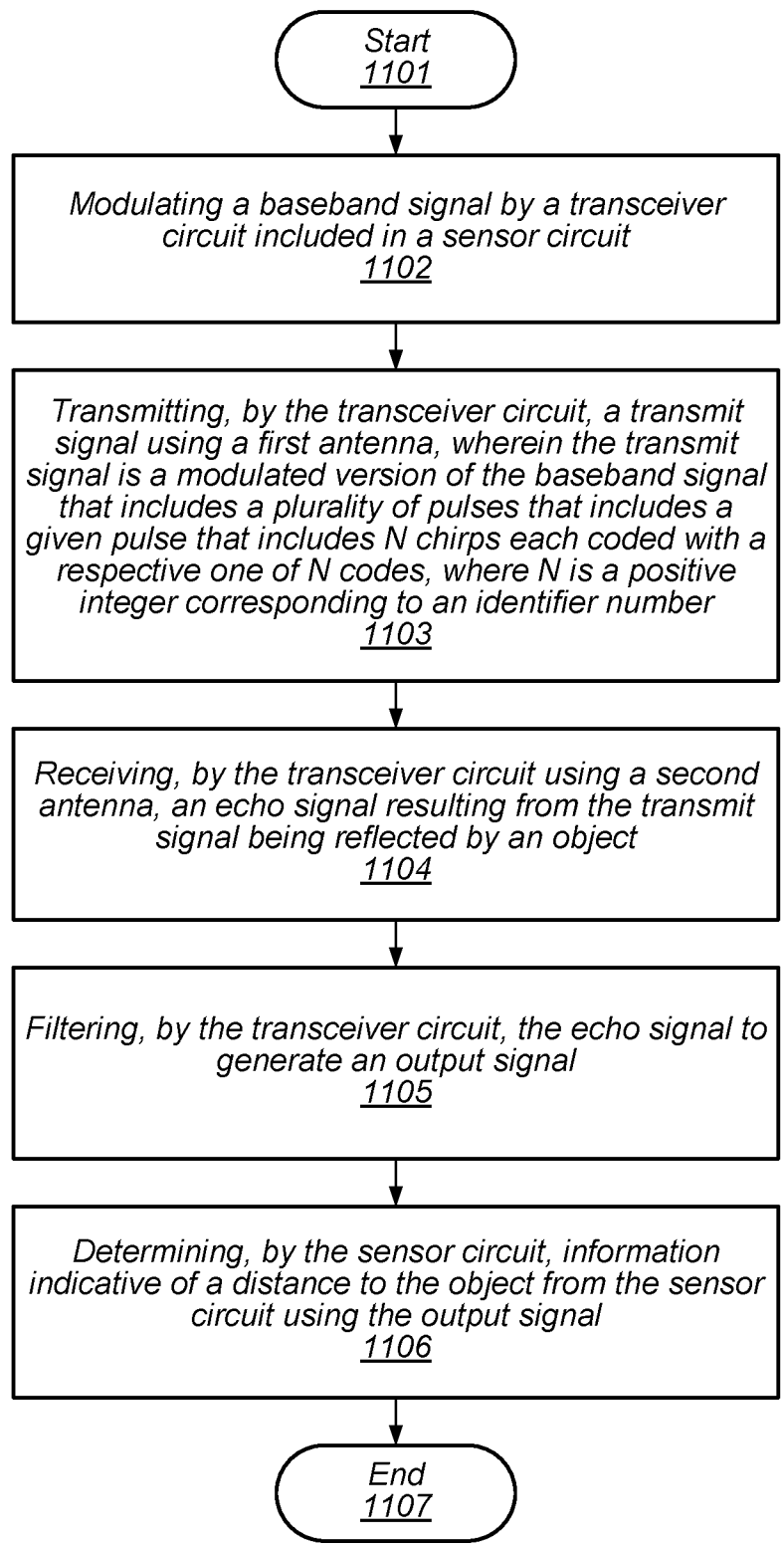
FIG. 11 illustrates a flow diagram depicting an embodiment of a method for operating a sensor circuit.

Turning to FIG. 11, a flow diagram depicting an embodiment of a method for operating a sensor circuit is illustrated. The method, which begins in block 1101, may be applied to sensor circuit 800 or any other suitable sensor circuit.

The method includes modulating a baseband signal by a transmitter circuit included in a sensor circuit (block 1102). In various embodiments, the method further includes generating, by the transceiver circuit, a modulation signal whose phase shifts each of N sub-periods included in a period of the particular one of the plurality of pulses. The method may also include generating, by the transceiver circuit, the transmit signal using the modulated signal and the baseband signal.

The method also includes transmitting, by the transceiver circuit, a transmit signal using a first antenna, where the transmit signal is a modulated version of the baseband signal that includes a plurality of pulses that includes a given pulse that includes N chirps each encoded with a respective one of N codes, where N is a positive integer corresponding to an identifier number (block 1103). The method may also include modifying respective amplitudes of a plurality of frequency components included in the transmit signal prior to transmitting the transmit signal.

In some embodiments, the method may also include generating a plurality of bits representative of the N chips, and converting the plurality of bits into an analog signal. In some cases, the plurality of bits may be converted into the analog signal by a digital-to-analog converter circuit, or any other suitable circuit. The method may also include generating the transmit signal using the analog signal. In some embodiments, generating the transmit signal using the analog signal may include amplifying, using an amplifier or other suitable circuit, the analog signal to generate the transmit signal.

The method further includes receiving, by the transceiver circuit using a second antenna, an echo signal resulting from the transmit signal being reflected by an object (block 1104). In some embodiments, the method may also include reducing, using a mixer circuit or other suitable circuit, a frequency of the echo signal to generate an intermediate frequency signal. The method may also include converting the intermediate frequency signal to a plurality of bits.

The method also includes filtering, by the transceiver circuit, the echo signal to generate an output signal (block 1105). In various embodiments, the method may also include performing a vector integration operation using the plurality of bits to generate integrated data. The method may also include performing a fast Fourier transformation operation using the integrated data to generate transformed data. In some embodiments, the method may include performing an inverse fast Fourier transformation operation using the transformed data to generate a plurality output bits.

The method further includes determining, by the sensor circuit, information indicative of a distance to the object from the sensor circuit using the output signal (block 1106). In some embodiments, the method included, determining, by a processor or other suitable circuit, the distance to the object from the sensor circuit using the plurality of output bits. The method concludes in block 1107.

Figure 12:
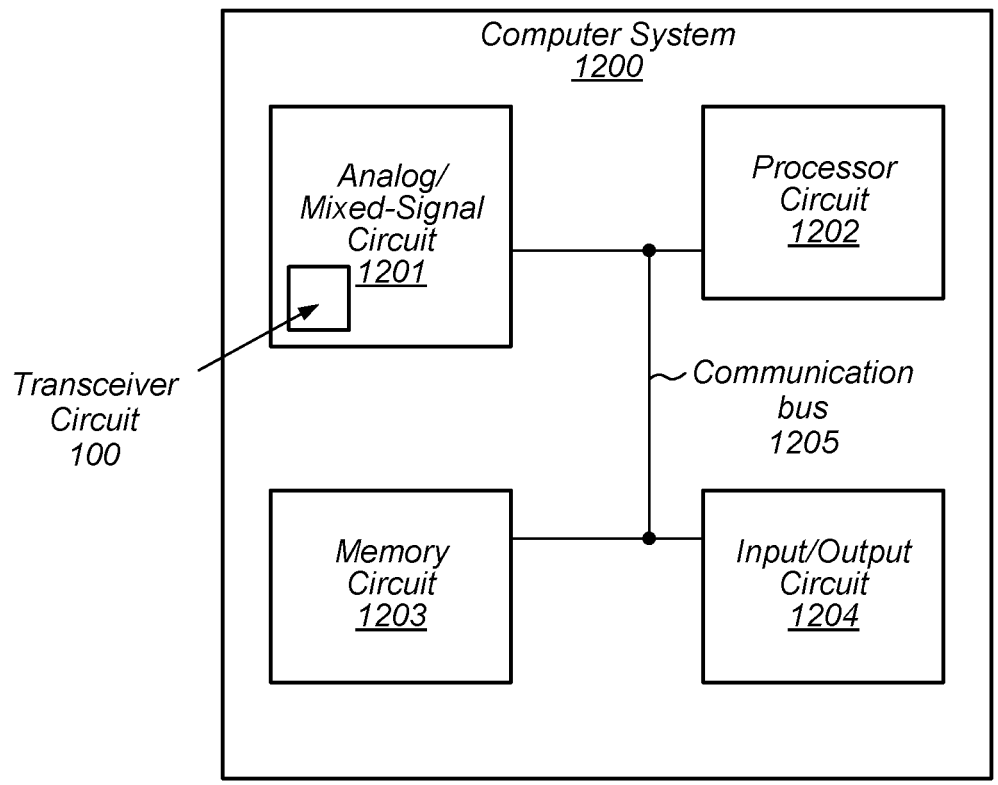
FIG. 12 is a block diagram of one embodiment of a computer system that includes a transceiver circuit.

A block diagram of computer system is illustrated in FIG. 12. As illustrated embodiment, the computer system 1200 includes analog/mixed-signal circuits 1201, processor circuit 1202, memory circuit 1203, and input/output circuits 1204, each of which is coupled to communication bus 1205. In various embodiments, computer system 1200 may be a system-on-a-chip (SoC) and be configured for use in a desktop computer, server, or in a mobile computing application such as, a tablet, laptop computer, or wearable computing device.

Analog/mixed-signal circuits 1201 includes a variety of circuits includes transceiver circuit 100. Additionally, analog/mixed-signal circuits 1201 may include a crystal oscillator circuit, a phase-locked loop (PLL) circuit, an analog-to-digital converter (ADC) circuit, and a digital-to-analog converter (DAC) circuit (all not shown). In other embodiments, analog/mixed-signal circuits 1201 may be configured to perform power management tasks with the inclusion of on-chip power supplies and voltage regulators.

Processor circuit 1202 may, in various embodiments, be representative of a general-purpose processor that performs computational operations. For example, processor circuit 1202 may be a central processing unit (CPU) such as a microprocessor, a microcontroller, an application-specific integrated circuit (ASIC), or a field-programmable gate array (FPGA).

Memory circuit 1203 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that in the embodiment of a computer system in FIG. 12, a single memory circuit is depicted. In other embodiments, any suitable number of memory circuits may be employed.

Input/output circuits 1204 may be configured to coordinate data transfer between computer system 1200 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1004 may be configured to implement a version of Universal Serial Bus (USB) protocol or IEEE 1394 (Firewire®) protocol.

Input/output circuits 1204 may also be configured to coordinate data transfer between computer system 1200 and one or more devices (e.g., other computing systems or integrated circuits) coupled to computer system 1200 via a network. In one embodiment, input/output circuits 1004 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1204 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a transmitter circuit configured to:
        store an identifier number;
        determine a code word using the identifier number, wherein the code word includes a plurality of numbers;
        generate a modulation signal, wherein a phase of the modulation signal shifts N times within a period of a particular one of a plurality of pulses, wherein N is a positive integer corresponding to a quantity of numbers included in the plurality of numbers;
        generate a transmit signal that includes the plurality of pulses using the modulation signal and a baseband signal, wherein a given one of the plurality of pulses includes a plurality of chirps coded with respective ones of the plurality of numbers; and
        broadcast the transmit signal using a first antenna; and
    a receiver circuit configured to:
        receive, using a second antenna, an echo signal that is a reflected version of the transmit signal; and
        generate an output signal using the echo signal.

2. The apparatus of claim 1, wherein the transmitter circuit includes:
    a control circuit configured to:
        generate a plurality of bits corresponding to a particular chirp of the plurality of chirps; and
        multiply the plurality of bits by a corresponding one of the plurality of numbers;
    a digital-to-analog converter circuit configured to convert the plurality of bits into an analog signal; and
    an amplifier circuit configured to generate the transmit signal using the analog signal.

3. The apparatus of claim 2, wherein the control circuit is further configured to modify the plurality of bits to adjust respective amplitudes of one or more chirps of the plurality of chirps.

4. The apparatus of claim 1, wherein the receiver circuit is further configured to:

down convert a frequency of the echo signal to generate a baseband frequency signal; and convert the baseband frequency signal to a plurality of sampled bits; and generate the output signal using the plurality of sampled bits.

5. The apparatus of claim 4, wherein the receiver circuit is further configured to:

perform a vector integration operation using the plurality of sampled bits to generate integrated data; and perform a fast Fourier transformation operation using the integrated data to generate frequency domain data.

6. A method, comprising:

storing, by a transmitter circuit, an identifier number;

determining, by the transmitter circuit, a code word using the identifier number, wherein the code word includes a plurality of numbers;

generating, by the transmitter circuit, a modulation signal, wherein a phase of the modulation signal shifts N times within a period of a particular one of a plurality of pulses, wherein N is a positive integer corresponding to a quantity of numbers included in the plurality of numbers;

generating, by the transmitter circuit, a transmit signal that includes the plurality of pulses using the modulation signal and a baseband signal, wherein a given one of the plurality of pulses includes a plurality of chirps coded with respective ones of the plurality of numbers; and broadcasting, by the transmitter circuit, the transmit signal using a first antenna;

receiving, by a receiver circuit using a second antenna, an echo signal that is a reflected version of the transmit signal; and generating, by the receiver circuit, an output signal using the echo signal.

7. The method of claim 6, further comprising:

generating, by the transmitter circuit, a plurality of bits corresponding to a particular chirp of the plurality of chirps;

multiplying, by the transmitter circuit, the plurality of bits by a corresponding one of the plurality of numbers;

converting, by the transmitter circuit, the plurality of bits into an analog signal; and generating, by the transmitter circuit, the transmit signal using the analog signal.

8. The method of claim 7, further comprising modifying, by the transmitter circuit, the plurality of bits to adjust respective amplitudes of one or more chirps of the plurality of chirps.

9. The method of claim 6, further comprising:

down converting, by the receiver circuit, a frequency of the echo signal to generate a baseband frequency signal;

converting, by the receiver circuit, the baseband frequency signal to a plurality of sampled bits; and generating, by the receiver circuit, the output signal using the plurality of sampled bits.

10. The method of claim 9, further comprising:

performing, by the receiver circuit, a vector integration operation using the plurality of sampled bits to generate integrated data; and performing, by the receiver circuit, a fast Fourier transformation operation using the integrated data to generate frequency domain data.

11. An apparatus, comprising:

a transceiver circuit including a first antenna and a second antenna, wherein the transceiver circuit is configured to:

store an identifier number;

determine a code word using the identifier number, wherein the code word includes a plurality of numbers;

generate a modulation signal, wherein a phase of the modulation signal shifts N times within a period of a particular one of a plurality of pulses, wherein N is a positive integer corresponding to a quantity of numbers included in the plurality of numbers;

generate a transmit signal that includes the plurality of pulses using the modulation signal and a baseband signal, wherein a given one of the plurality of pulses includes a plurality of chirps coded with respective ones of the plurality of numbers;

broadcast the transmit signal using the first antenna;

receive, using the second antenna, an echo signal that is a reflected version of the transmit signal; and generate an output signal using the echo signal.

12. The apparatus of claim 11, wherein the transceiver circuit is further configured to:

generate a plurality of bits corresponding to a particular chirp of the plurality of chirps;

multiple the plurality of bits by a corresponding one of the plurality of numbers;

convert the plurality of bits into an analog signal; and generate the transmit signal using the analog signal.

13. The apparatus of claim 12, wherein the transceiver circuit is further configured to modify the plurality of bits to adjust respective amplitudes of one or more chirps of the plurality of chirps.

14. The apparatus of claim 11, wherein the transceiver circuit is further configured to down convert a frequency of the echo signal to generate a baseband frequency signal; and convert the baseband frequency signal to a plurality of sampled bits; and generate the output signal using the plurality of sampled bits.

15. The apparatus of claim 14, wherein the transceiver circuit is further configured to:

perform a vector integration operation using the plurality of sampled bits to generate integrated data; and perform a fast Fourier transformation operation using the integrated data to generate frequency domain data.

* * * * *